Patented Nov. 27, 1951

2,576,323

UNITED STATES PATENT OFFICE 2,576,323

HYDROPYRAN COMPOUNDS

Richard R. Whetstone, Orinda, Calif., assignor to Shell Development Company, San Francisco, Calif., a corporation of Delaware No Drawing. Application May 28, 1949,
Serial No. 96,141

9 Claims. (Cl. 260—333)

This invention relates to new oxygen-heterocyclic compounds and to a process for the manufacture thereof. More particularly, the present invention relates to a novel group of useful compounds which may be prepared by the interaction of certain hydropyran aldehydes with organic compounds containing an activated methylene or methine radical. In one of its more specific embodiments, the invention is directed particularly to novel hydropyran compounds which may be prepared by the interaction of suitable hydropyran aldehydes with dicarbonyl compounds containing a methylene or methine radical activated by the direct attachment thereto, in geminate relation, of two carbonyl groups, and to a process for effecting the reaction to produce the desired products. In one of its most specific embodiments, the invention relates to new and useful polycarbonylic compounds which may be prepared by condensing lower dihydropyran aldehydes wherein the formyl group is directly linked to a nuclear saturated carbon atom which, in turn, is directly linked to the hetero oxygen atom of the dihydropyran ring, with dicarbonyl compounds wherein there is present a methylene or methine radical directly linked via monovalent bonds to two carbonyl groups, and to a process for effecting the desired reaction while at the same time reducing or precluding the occurrence of undesired side-reactions which would lead to the formation of products other than those desired.

The present invention is based upon and results from the discovery that certain hydropyran aldehydes may be caused to react with organic compounds containing an activated methylene or methine radical, i. e., a methylene or methine radical to which there are directly linked two carbon atoms which, in turn, are directly united via multiple bonds to atoms of non-metal elements other than carbon, to preferentially produce valuable new compounds in the hydropyran series of compounds which may be employed in a wide variety of industrial or technical applications. It has been discovered in accordance with the invention that, by reacting under suitable conditions lower hydropyran aldehydes with the hereinbefore and hereinafter more fully disclosed types of organic compounds containing an activated methylene or methine radical, there may be prepared novel compounds which may be described in the general case by means of the generic structural formula Py—CH=Z

In this formula, Py represents a hydropyranyl group, that is, a dihydropyranyl group or a tetrahydropyranyl group, which hydropyranyl group may have one or more of the hydrogen atoms on the ring replaced by a suitable substituent group or atom or by suitable substituent groups or atoms, $n$ represents an integer having a value of from 1 to 2, inclusive, and Z represents the residue represented by $$(CR_{n'-1}BB')$$ 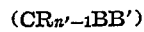

in which $n'$ is an integer equal in value to $n$, R represents a hydrogen or hydrocarbon radical, and B and B' represent monovalent radicals independently selected from the class consisting of acyl, carboxyl, and radicals hydrolyzable to carboxyl.

The hydropyran aldehydes are, broadly speaking, those heterocyclic aldehydes which would result from the addition of hydrogen to the nucleus of the corresponding unsubstituted or substituted pyranyl aldehyde to saturate at least one of the pair of nuclear double bonds thereof. While a hydropyranyl aldehyde thus could be regarded as a pyranyl aldehyde which has been partially or completely hydrogenated in the nucleus, for practical reasons hydropyranyl compounds are rarely, if ever, prepared by hydrogenation of corresponding pyranyl compounds. Among the reasons for this are the difficulty in general, and often the impossibility of synthesizing pyranyl compounds due to the instability of the pyranyl nucleus or ring, and the consequent unavailability of pyranyl compounds which could be thus employed as the necessary intermediates. Because of the generally marked difference in the stability of the ring as between pyranyl compounds and hydropyranyl compounds, and particularly because of the freedom of hydropyranyl compounds from multiple nuclear unsaturation, especially of the conjugate type, the respective two types of compounds are generally regarded by those skilled in the art as not ordinarily comparable and as falling within properly distinguishable chemical groupings.

The novel compounds which are provided by the invention may be prepared or formed by condensing suitable hydropyran aldehydes with organic compounds containing an activated methylene or methine radical. Suitable organic compounds containing activated methylene or methine radicals contain an aliphatic carbon atom to which there is directly linked at least one atom of hydrogen and to which there are additionally directly linked by univalent bonds two carbon atoms both of which are directly united by multiple bonds to atoms of one or more elements other than carbon, particularly atoms of nitrogen, oxygen, and/or divalent sulfur, and which have their remaining valencies, if any, satisfied by union with separate monovalent groups or atoms. The term aliphatic carbon atom is employed in the present specification and claims to refer to a carbon atom that is combined in aliphatic, as opposed to aromatic, linkages and thus may include a carbon atom bound in a non-aromatic ring or alicyclic group. The compounds with which the hydropyran aldehydes are condensed according to the invention contain a methylene or methine radical activated by the direct attachment thereto, i. e., by attachment in geminate relation, of two radicals independently selected from the class consisting of acyl, carboxyl, and radicals hydrolyzable to carboxyl. The compounds with which the hydropyran aldehydes are condensed to form the novel products provided by the invention comprise, more specifically speaking, compounds containing a saturated carbon atom bearing at least one atom of hydrogen, to which there are linked two carbon atoms both of which are directly linked via multiple bonds to atoms of nitrogen, oxygen or divalent sulfur. The polar groups geminately bonded to the carbon atom of the activated methylene or methine radical preferably are the only polar groups in the molecule.

Although any such compound containing an activated methylene or methine radical may be employed for reaction with the present hydropyran aldehydes in accordance with the process of the invention, the process is especially advantageous when applied to the use of aliphatic dicarbonyl compounds of the above-defined class.

One sub-group of dicarbonyl compounds to which the process of the invention may be applied with particular effectiveness comprises the beta-diketones and the beta-ketoaldehydes wherein the carbon atom to which the carbonyl groups are geminately linked bears at least one atom of hydrogen. Representative of such beta-diketones are, for example, acetylacetone, acetylpropionylmethane, acetylbutyrylmethane, acetylisobutyrylmethane, acetylcaproylmethane, alpha,alpha - diacetylethane, acetylisoamylmethane, allyldiacetylmethane, acetylmethylheptenone, butyrylisobutyrylmethane, alpha-methyl-alpha-butyrylacetone, formylacetone, diethylacetylacetaldehyde, alpha-propionylacetaldehyde, trimethylacetylacetaldehyde, valerylacetaldehyde, caproylacetaldehyde, and the like and their homologs and their analogs. Beta-ketoaldehydes which may be employed in the process of the invention may exist predominately in their isomeric "aci," or enolic form.

A further valuable subgroup of compounds containing activated methylene or methine radicals to which the process of the invention may be applied comprises the beta-keto carboxylic acids and suitable derivatives of the beta-keto carboxylic acids. Representative members of this subgroup of compounds are, for example, acetoacetic acid, methylacetoacetic acid, ethylacetoacetic acid, propylacetoacetic acid, propionylacetic acid, butyrylacetic acid, butyrylbutyric acid, decoylacetic acid and the like and their homologs and their analogs.

The process of the invention is suited to reacting with hydropyran aldehydes various suitable derivatives of the beta-keto carboxylic acid. Among the suitable derivatives there are included, for example, the esters, particularly the monohydric alcohol esters, such as the methyl, ethyl, propyl, isopropyl, butyl, capryl, decyl and esters of higher monohydric alcohols, and salts of the beta-keto carboxylic acids, such as the salts thereof with the alkali metal hydroxides and alkaline earth metal hydroxides. Instead of suitable salts and esters of such beta-keto carboxylic acids, there may be employed suitable derivatives wherein the carboxyl group of the acid has been replaced by a nitrogen-containing group hydrolyzable to carboxyl, e. g., by a cyano group, a carbamyl group or N-substituted carbamyl group, such as, specifically, acetoacetic amide, and the N-alkyl acetoacetic amides, acetoacetic acid nitrile, iminoacetoacetic nitrile and the like and homologs and analogs thereof. A still further subgroup of compounds containing activated methylene or methine radicals and to which the process of the invention may be applied comprises the beta-dicarboxylic acids and their suitable derivatives. The free acids may be employed according to the invention, such as, for example, malonic acid, ethylidene succinic acid, ethylmalonic acid, n-butylmalonic acid, isobutylmalonic acid, cetylmalonic acid, n-hexylmalonic acid, n-amylmalonic acid, laurylmalonic acid, and the like and their various homologs and analogs. There may be employed suitable derivatives of the beta-dicarboxylic acids wherein one or both of the carboxyl groups has or have been replaced by groups hydrolyzable to carboxyl, such as carboalkoxy, carbometalloxy, cyano, carbamyl or N-substituted carbamyl etc. The following, among others, are illustrative of such derivatives: esters, such as malonic monoethyl ester, malonic monomethyl ester, the potassium salt of malonic monomethyl ester, diethyl malonate, malonyl chloride monoethyl ester, malonamic ester, iminomalonic acid ethyl ester; salts, such as dipotassium malonate and dicalcium malonate; meno- and dinitriles, such as cyanoacetic acid, ethyl cyanoacetate, malonitrile, cyanoacetamide, alpha-cyanopropionic acid ethyl ester, malonamide, ethylidene succinic diamide. One or both of the radicals attached to the activated methylene or methine radicals may be substituted by alkyl, aryl, aralkyl and/or alkaryl radicals.

According to the invention, the novel compounds contemplated may be prepared by reacting with activated methylene or methine compounds of the hereinbefore defined class, hydropyran aldehydes which correspond in structure to the formula Py—CHO in which Py represents a hydropyranyl group and wherein the formyl group (—CHO) is directly attached to one of the nuclear or ring carbon atoms. More specifically, the hydropyran aldehyde reactants which are employed in accordance with the process of the invention may be defined as lower hydropyran aldehydes wherein the aldehyde, or formyl, group is directly linked to a carbon atom of the hydropyran nucleus, which carbon atom preferably is saturated and directly linked to the nuclear or heterocyclic oxygen atom of the hydropyran ring. Products of particular value and utility are prepared when the hydropyran ring is one which contains nuclear unsaturation, preferably between two olefinic carbon atoms one of which is directly linked to the nuclear or heterocyclic oxygen atom. These hydropyran aldehydes may be referred to generally as the $\Delta^5$-dihydropyran aldehydes or as the 3,4-dihydro-1,2-pyran-2-carboxaldehydes. Because of their greater availability, their low cost, and the desirable properties of the products prepared therefrom, a preferred subgroup of hydropyran aldehydes which may be employed in accordance with the invention may be defined by means of the formula

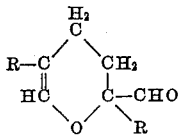

in which each R represents a hydrogen atom or a hydrocarbon group, preferably a lower alkyl group. Hydropyran aldehydes of the foregoing formula may be prepared by condensing under controlled conditions at an elevated temperature in the presence of a small amount of a polymerization inhibitor, such as hydroquinone, alpha-methylene aldehydes, such as the alpha-methylene aliphatic aldehydes, acrolein, methacrolein, alpha-ethyl-acrolein, and their suitable homologs and analogs. Processes for effecting such condensation of alpha-methylene aldehydes are disclosed and claimed by me in my copending applications, Serial Nos. 735,029 and 713,455, filed March 15, 1947 and December 2, 1946, respectively, now U. S. Patent Nos. 2,479,284 and 2,479,283, respectively, issued August 16, 1949. Representative hydropyran aldehydes which may be employed in accordance with the present invention include, for example, $\Delta^5$-dihydropyran-2-carboxaldehyde, 2,5-dimethyl-$\Delta^5$-dihydropyran-2-carboxaldehyde, 2-methyl-$\Delta^5$-dihydropyran-2-carboxaldehyde, 2,5-diethyl-$\Delta^5$-dihydropyran-2-carboxaldehyde, 2,5-dipropyl-$\Delta^5$-dihydropyran-2-carboxaldehyde, 2,5-dineopentyl-$\Delta^5$-dihydropyran-2-carboxaldehyde, 2,5-diphenyl-$\Delta^5$-dihydropyran-2-carboxaldehyde, and the like and their homologs and their analogs. Particularly suited to the objects of the present invention are $\Delta^5$-dihydropyran-2-carboxaldehyde, its mono-substitution products having an alkyl group in the No. 2 position of the ring and its di-substitution products having alkyl groups in each of the No. 2 and No. 5 positions of the dihydropyranyl ring. In accordance with the present invention, the process may also be applied to reacting tetrahydropyran aldehydes, which may have one or more hydrogen atoms on the nucleus replaced by alkyl, aryl, aralkyl and/or alkaryl groups, such as tetrahydropyran-2-carboxaldehyde, and its various suitable substitution products. Illustrative of these tetrahydropyran aldehydes are tetrahydropyran-2-carboxaldehyde, 2,5-dimethyltetrahydropyran-2-carboxaldehyde, 2,5-dineopentyltetrahydropyran-2-carboxaldehyde, 2,5-dioctyltetrahydropyran-2-carboxaldehyde and analogs and homologs and substitution products thereof.

The reaction between the hydropyran aldehyde and the compound containing an activated methylene or methine group is effected according to the present invention by bringing the two reactants together in liquid phase, maintaining the mixture at reaction temperature until the reaction is substantially completed, and then recovering the desired product from the reaction mixture. The reaction may be accelerated and/or its course controlled by the application of heat to the reaction mixture, or by conducting the reaction in the presence of a suitable condensation catalyst, or by the application of both heat and a condensation catalyst.

Although the process of the invention may be conducted at temperatures throughout a relatively wide range, satisfactory yields of the desired products may be obtained by conducting the reaction in the liquid phase and at temperatures within the range of from about $-20°$ C. to about $+150°$ C., a preferred range being from about $0°$ C. to about $120°$ C. In the case of thermally-sensitive products which may be formed, e. g., geminate dicarboxylic acids, the use of maximum temperatures somewhat below these upper limits generally is preferable, for example, temperatures not over about $70°$ C. In general, the use of the higher operable temperatures, for example, temperatures above about $50°$ C., favors the formation of products corresponding to the generic formula given hereinbefore when $n$ has the value of 2. At the lower temperatures, particularly when the process is conducted in the presence of a condensation catalyst, the formation of products corresponding to the generic formula when $n$ has the value of unity tends to be favored. The optimum temperature for the formation of the desired product will depend upon the other conditions under which the reaction is effected, that is, whether or not a catalyst is present, whether a solvent medium is present and if so its identity, whether water is removed as formed from the reacting mixture, etc. The process is subject to variation as to the relative amounts of the respective reactants employed. Generally the compound containing the activated methylene or methine radical will be employed in molar excess relative to the hydropyran aldehyde, mole ratios of about 1:1 to about 10:1 being generally satisfactory.

The reaction whereby the desired products are formed may be accelerated by effecting it in the presence of a condensation catalyst. Suitable condensation catalysts include, among others, acids, acid salts, and substances which generate acid in situ, as well as alkaline-acting substances such as bases, basic salts, and substances which generate a base in situ. Suitable acidic or acid-forming condensation catalysts include, for example, mineral acids, such as HCl, $H_2SO_4$, HBr, $H_3PO_4$, etc., as well as acidic salts, such as $NaH_2PO_4$, $NaHSO_4$, $ZnCl_2$, $FeCl_3$, and the like, and organic acids, such as acetic acid and other fatty acids, the anhydrides of the fatty acids, e. g., acetic anhydride and the like. Basic condensation catalysts include the alkali metal hydroxides, the alkaline earth metal hydroxides, the corresponding carbonates, and basic substances of organic character, such as amines, e. g., trimethylamine, pyridine, piperidine, methylethyl-isobutylamine, beta-picoline, etc., and quaternary ammonium bases, e. g., benzyltrimethylammonium hydroxide. The acidic catalysts, particularly the strongly acidic catalysts, preferably are employed in moderate amount, for example, up to about 10% of the weight of the reactants. The reaction in such cases preferably is conducted under substantially anhydrous conditions. Since the hydropyran aldehydes tend in themselves to react or condense in the presence of alkaline substances, the strongly basic condensation catalysts, e. g., caustic alkalies, likewise are employed with caution as to the amounts of the basic condensation catalyst and the severity of the reaction conditions. Secondary and tertiary amines, e. g., di- and trialkylamines and polymethyleneimines, e. g., piperidine, may be employed with particular efficacy as the condensation catalyst, with the advantage that their use has a minimal tendency to favor the formation of undesired by-products and leads to formation in maximal yields of the desired products. Only small amounts of such amines need be used, amounts from about 0.02% to about 10% by weight of the reactants being generally satisfactory, and amounts from about 0.05 to about 2% by weight of the reactants being preferred.

The reaction between the hydropyran aldehyde and the activated methylene or methine compound may be effected in either a batchwise, an intermittent, or a continuous manner. The catalyst (if one is to be employed), the hydropyran aldehyde, and the activated methylene or methine compound may be mixed in a suitable reaction vessel and the mixture maintained at the desired reaction temperature until the reaction is substantially completed. It has been discovered that the rate of the reaction, and in certain cases even the course of the reaction, may be controlled or directed by controlling the water content of the reaction, as by continuously withdrawing water from the reaction mixture substantially as rapidly as it is generated therein by the reaction. Although any of various methods may be applied for withdrawing the evolved water, it is particularly convenient and efficacious to conduct the reaction in the presence of an added inert organic solvent which forms an azeotrope with the water, and to conduct the reaction substantially at the boiling point of the reaction mixture thereby distilling the solvent-water azeotrope from the mixture during the reaction and removing the water evolved. Known solvents, such as benzene, toluene, chloroform, carbon tetrachloride, etc., which form water azeotropes may be employed. The reaction and the distillation may be carried out under atmospheric pressures, i. e., at the boiling point of the mixture under atmospheric pressures, or the reaction may be accomplished at higher or lower temperatures by conducting the distillation under superatmospheric pressures or subatmospheric pressures, respectively. The process of the invention may be executed in the presence of inert organic solvents while foregoing the withdrawal of evolved water. Substances which may be employed as solvents include, without being limited to, pyridine, octane, dioxane, toluene, ethylene glycol diethyl ether, dipropyl ether, ethyl acetate, and the like. The process preferably is conducted in the absence of added water, that is, in the absence of water other than that formed in the reaction.

The reaction upon which the present invention is based may be accomplished by the process which is illustrated in the following specific experiments. It is to be understood, however, that there is no intention of limiting the invention to the specific details presented in these examples, or to the specific products produced therein, and that numerous variations are possible and are contemplated as within the scope of the hereinafter appended claims.

In the first experiment, a mixture of 200 parts of acetylacetone and 112 parts of Δ⁵-dihydropyran-2-carboxaldehyde was prepared and cooled by immersion of the reaction vessel in an ice-bath to the ice-bath temperature. One part of piperidine was added to the cold mixture. After the initial reaction subsided, as judged by the decreased evolution of heat, the mixture was allowed to warm to room temperature. After a further time at room temperature the resulting viscous liquid was fractionally distilled under reduced pressure. One hundred thirty parts of product distilling at 120°–125° C. under 9 millimeters mercury pressure were recovered. The product was identified as the hydropyran compound 5,9-epoxy-3-acetyl-3,8-nonadiene-2-one, of the formula

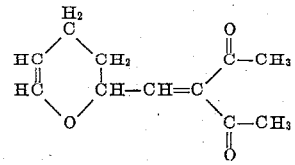

As a further illustration of the method of the invention, 78 parts by weight of Δ⁵-dihydropyran-2-carboxaldehyde, 100 parts of acetylacetone, and 135 parts of benzene were mixed in a flask equipped with a fractionating column arranged for reflux condensation with withdrawal of light ends or lower boiling fractions. The reaction mixture was heated at boiling under the atmospheric pressure for 24 hours. During the heating, the water-benzene azeotrope which formed and distilled was collected and withdrawn from the system. A total of 14 parts of water was collected. The remaining mixture was distilled under reduced pressure from a Claisen flask. The fraction distilling between 98° C. and 109° C. under 1 millimeter mercury pressure, amounting to 68 parts, was collected. The product was identified as the compound having the structure

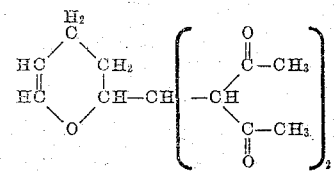

Analyses: Found, 65.7% carbon and 7.3% hydrogen; Calculated for $C_{16}H_{22}O_5$, 65.3% carbon and 7.5% hydrogen.

The foregoing products are representative of a subgroup of new compounds which is included within the invention. Further individual compounds within the subgroup may be prepared similarly, substituting for the acetylacetone employed in the specific experiments homologous or analogous beta-diketones and/or by substituting for the hydropyran aldehyde employed in the examples other hydropyran aldehydes of the herein disclosed class. The subgroup corresponds to the structural formula

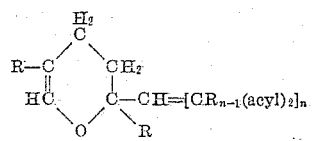

in which each R represents one of the class consisting of the hydrogen and hydrocarbon radicals and $n$ represents an integer having a value from 1 to 2, inclusive, the $n$'s being the same. The following are further compounds illustrative of this subgroup.

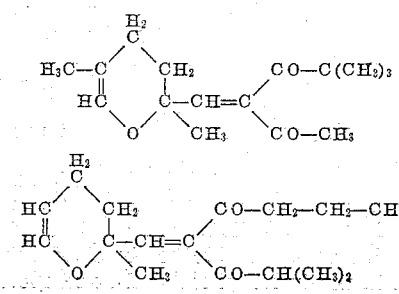

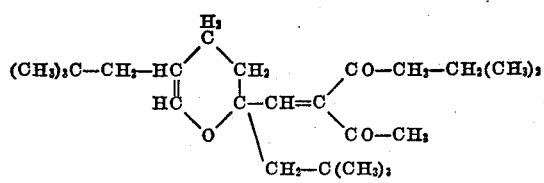
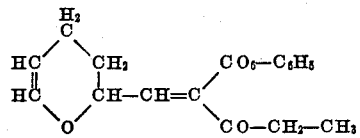
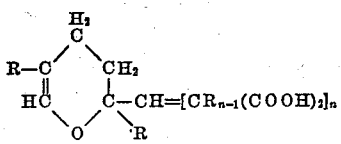

in which each R represents one of the class consisting of the hydrogen and hydrocarbon radicals and $n$ represents an integer having a value of from 1 to 2, inclusive, the $n$'s being the same. Members of the subgroup, which may be prepared by condensing with hydropyran aldehydes geminate dicarboxylic acids, e. g., malonic acid and monosubstituted malonic acids, include the following exemplary compounds:

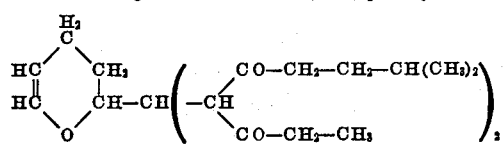
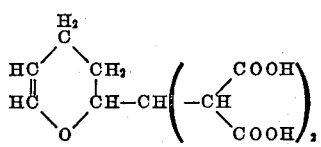
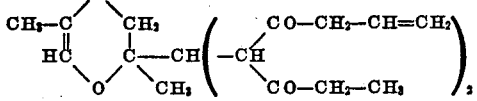
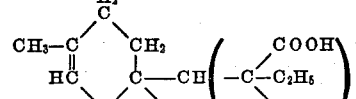
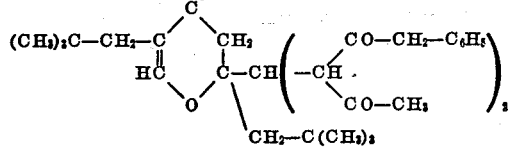
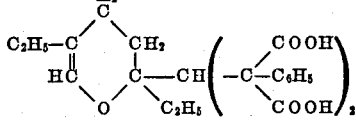
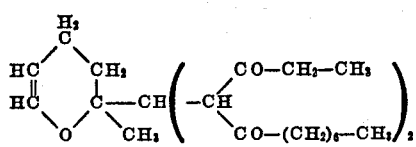
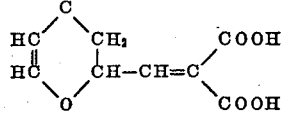
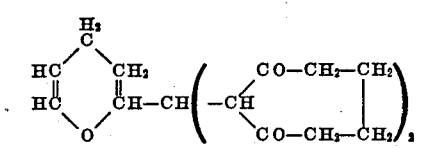
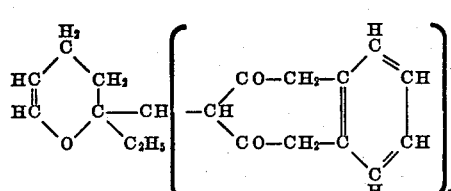
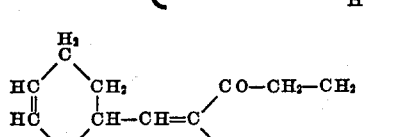
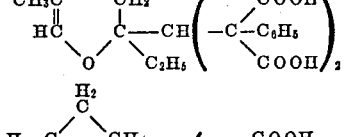
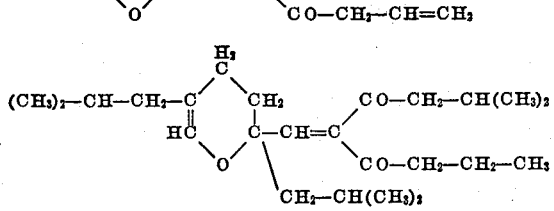
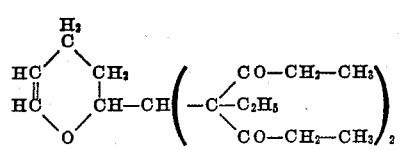

A further subgroup of compounds within the scope of the generic invention is represented by the formula

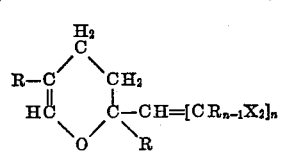

in which each R represents one of the class consisting of the hydrogen and hydrocarbon radicals, $n$ represents an integer having a value of from 1 to 2, inclusive, the $n$'s being the same, and X A further subgroup of novel compounds provided by the invention is described by the formula represents groups hydrolyzable to carboxyl. The following compounds which may be prepared according to the method of the invention are representative of the foregoing group:

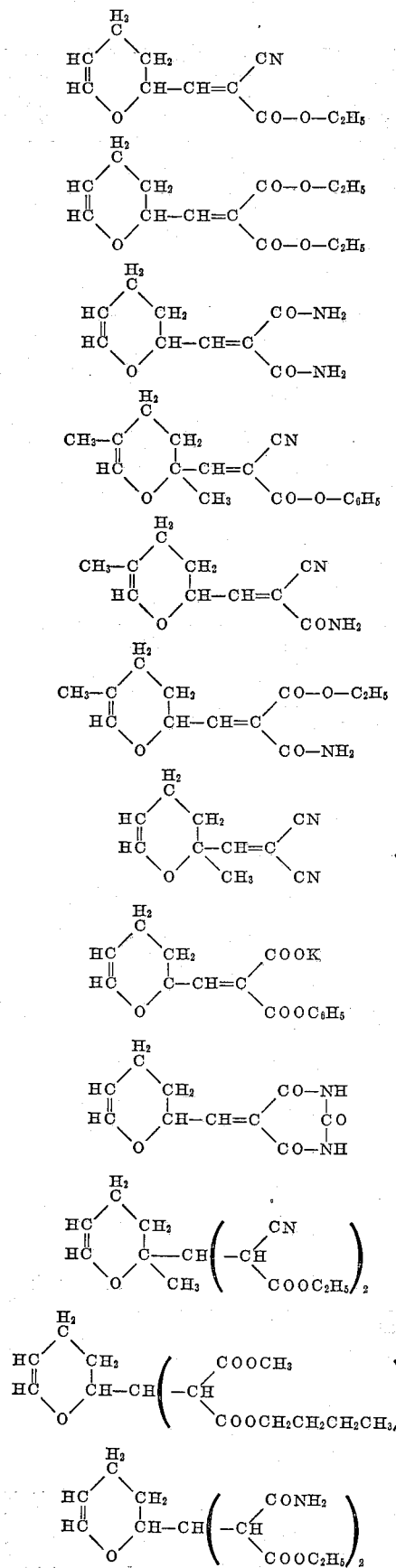

The invention includes within its generic concepts nuclearly-saturated hydropyran compounds corresponding to the foregoing dihydropyran compounds and types of hydropyran compounds, obtainable by condensing nuclearly-saturated hydropyran aldehydes with activated methylene or methine compounds according to the process of the invention. The following are representative of such novel nuclearly-saturated hydropyran compounds:

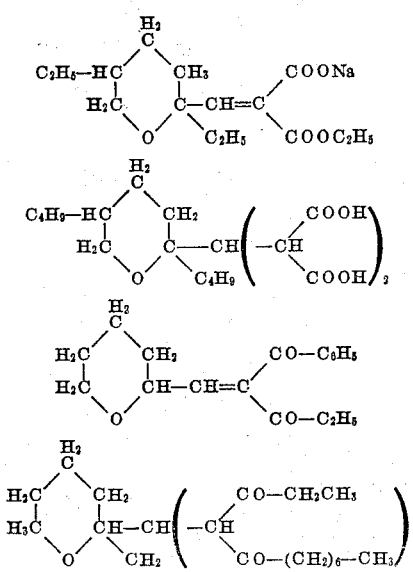

The invention includes compounds having various fields of utility. It will be seen that each of the compounds and types of compounds by which the invention is characterized by the presence of not more than one nuclear unsaturated linkage, that is, not more than one pair of carbon atoms in the hydropyranyl ring interconnected by multiple linkages, and by the attachment of the polar or functional side chain radical to a saturated carbon atom which is directly linked to the heterocyclic oxygen atom of the hydropyran ring. It appears that improved and unique characteristics of the present novel compounds can be attributed in large measure to the distinguishing structural features thereof, and to the presence of the hydropyran nucleus or ring.

The new compounds may be employed as new chemical intermediates useful in the synthesis of desired organic compounds. Products provided by the invention are of interest as intermediates for the synthesis of new and improved biologically active materials. Insecticides, fungicides and germicides, as well as therapeutically useful products may be prepared according to the invention. The new products include further, products of interest for use in the photographic art, in the compounding and vulcanization of rubber, and in the preparation of resins.

I claim as my invention:
1. A chemical compound of the structure

in which Py represents a radical selected from the class consisting of hydropyranyl and hydrocarbon-substituted pyranyl, $n$ represents an integer having a value of from 1 to 2, inclusive, and Z represents

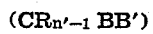

in which $n'$ represents an integer equal in value to $n$, R represents one of the class consisting of the hydrogen and hydrocarbon radicals, and B and B' represent monovalent radicals independently selected from the class consisting of acyl radicals composed of carbon, hydrogen, and oxygen, carboxyl, cyano, carbamyl, N-alkylcarbamyl, carboalkoxy, chloroformyl, and carbometalloxy.

2. A chemical compound according to claim 1 when $n$ has the value of unity.
3. A chemical compound of the structure

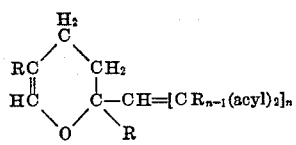

in which each R represents one of the class consisting of the hydrogen and hydrocarbon radicals, and $n$ represents an integer having a value of from 1 to 2, inclusive, the $n$'s being the same, the acyl being composed of carbon, hydrogen and oxygen.

4. A chemical compound of the structure

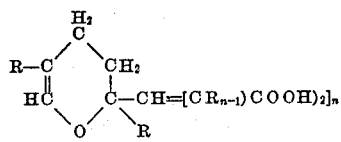

in which each R represents one of the class consisting of the hydrogen and hydrocarbon radicals, and $n$ represents an integer having a value of from 1 to 2, inclusive, the $n$'s being the same.

5. A chemical compound of the structure

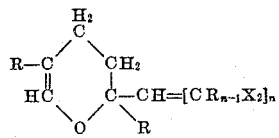

in which R represents one of the class consisting of the hydrogen and hydrocarbon radicals, $n$ represents an integer having a value of from 1 to 2, inclusive, the $n$'s being the same, and each X represents a carboalkoxy radical.

6. The chemical compound of the structure

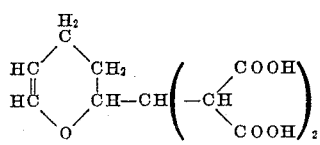

7. The chemical compound of the structure

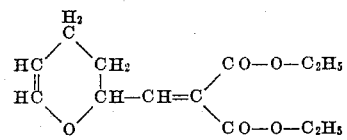

8. The chemical compound of the structure

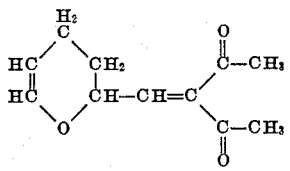

9. The chemical compound of the structure

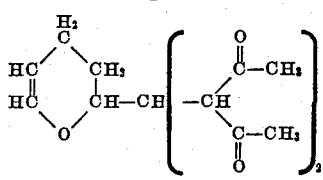

RICHARD R. WHETSTONE.

No references cited.